United States Patent
Wu

(10) Patent No.: US 8,596,880 B2
(45) Date of Patent: Dec. 3, 2013

(54) OPTICAL FIBER CONNECTOR ADAPTER AND RELATED OPTICAL FIBER CONNECTOR ASSEMBLY

(75) Inventor: Kai-Wen Wu, New Taipei (TW)

(73) Assignee: Hon Hai Precision Industry Co., Ltd., New Taipei (TW)

(*) Notice: Subject to any disclaimer, the term of this patent is extended or adjusted under 35 U.S.C. 154(b) by 7 days.

(21) Appl. No.: 13/527,594

(22) Filed: Jun. 20, 2012

(65) Prior Publication Data

US 2013/0011099 A1 Jan. 10, 2013

(30) Foreign Application Priority Data

Jul. 7, 2011 (TW) .............................. 100124127 A

(51) Int. Cl.
*G02B 6/38* (2006.01)
*G02B 6/36* (2006.01)
*G02B 6/26* (2006.01)

(52) U.S. Cl.
USPC .............................................. 385/74; 385/83

(58) Field of Classification Search
USPC ......... 385/74–76, 88–93, 147, 33, 35, 60, 64, 385/65, 66, 83; 264/1.25
See application file for complete search history.

(56) References Cited

U.S. PATENT DOCUMENTS

| | | | | |
|---|---|---|---|---|
| 4,119,362 A * | 10/1978 | Holzman | ........................ | 385/74 |
| 4,718,744 A * | 1/1988 | Manning | ........................ | 385/79 |
| 5,495,545 A * | 2/1996 | Cina et al. | ...................... | 385/92 |
| 7,775,725 B2 * | 8/2010 | Grinderslev | .................... | 385/74 |
| 8,297,852 B2 * | 10/2012 | Lin | ................................ | 385/74 |
| 8,403,567 B2 * | 3/2013 | Yu et al. | .......................... | 385/74 |
| 8,454,243 B2 * | 6/2013 | Hsu | ................................ | 385/74 |
| 8,459,979 B2 * | 6/2013 | Wu | ................................ | 425/190 |

* cited by examiner

*Primary Examiner* — Akm Enayet Ullah
(74) *Attorney, Agent, or Firm* — Altis & Wispro Law Group, Inc.

(57) ABSTRACT

An optical fiber connector adapter for coupling a first optical fiber connector to a second optical fiber connector includes a lens body. The lens body includes a first surface and an opposite second surface. A positioning hole is defined in the first surface. A lens hole is defined in the first surface and a first lens is formed on a bottom in the lens hole. The first lens is beneath the first surface and adjacent to the positioning hole. A positioning post and a second lens protrude from the second surface. The second lens is aligned with the first lens. An optical fiber connector assembly having the optical fiber connector adapter is also provided.

10 Claims, 3 Drawing Sheets

OPTICAL FIBER CONNECTOR ADAPTER AND RELATED OPTICAL FIBER CONNECTOR ASSEMBLY

BACKGROUND

1. Technical Field

The present disclosure relates to an adapter for an optical fiber connector and a related optical fiber connector assembly.

2. Description of Related Art

Optical fiber connectors can be used as an interface for high-speed transmission of electronic data between a computer host and a computer peripheral apparatus, such as a scanner, a digital camera, a mobile phone, a music player, and others. The optical fiber connector often includes a female optical fiber connector and a male connector respectively having a main body, at least two optical lenses protruding from the main body, and at least two optical fibers accommodated in the main body. When in use, one end of the male connector is plugged in the female optical fiber connector, the at least two lenses of the female optical fiber connector each couple with a corresponding lens of the male connector, and electronic data is transmitted. However, if the male connector is plugged in and out of the female optical fiber connector too often, the male connector and the female optical fiber connector may abrade and misalign. This will shorten the lifetime of the optical fiber connector.

Therefore, it is necessary to provide an optical fiber connector adapter and a related optical fiber connector assembly that can address the limitations described.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Embodiments of the present optical fiber connector adapter and a related optical fiber connector assembly are now described in detail and with reference to the drawings.

Figure 1:
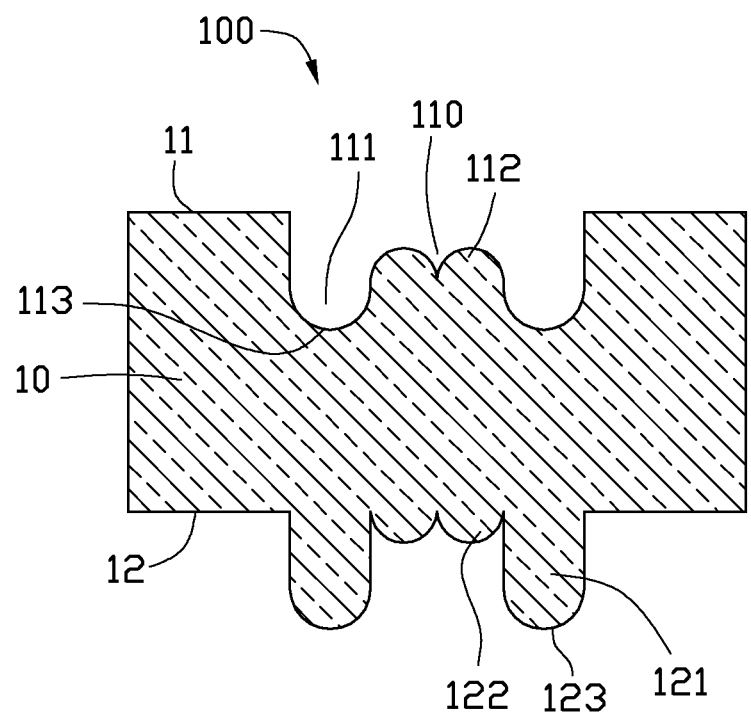
FIG. 1 is a sectional view of an optical fiber connector adapter in accordance with a first exemplary embodiment.

FIG. 1 is an optical fiber connector adapter 100 in accordance with a first exemplary embodiment of the present disclosure. The optical fiber connector adapter 100 is configured for coupling a first optical fiber connector to a second optical fiber connector, the optical fiber connector adapter. The optical fiber connector adapter 100 includes a lens body 10. The lens body 10 is generally rectangular parallelepiped shaped. The lens body 10 has a first surface 11 and an opposite second surface 12 parallel with the first surface 11. The lens body 10 is comprised of a same light pervious material.

The first surface 11 defines two first positioning holes 111 and a lens hole 110 therein. The lens hole 110 is arranged between the first positioning holes 111. In this embodiment, the first positioning holes 111 are blind and cylindrical. The lens body 10 has a concave surface 113 at an end of each of the first positioning holes 111. Each of the first positioning holes 111 is configured for engaging one positioning post of the first optical fiber connector.

Two lenses 112 are formed on a bottom in the first positioning holes 111. The two first lenses 112 are arranged beneath and between the two first positioning holes 111, and are convexing toward the first surface 11. The lenses 112 are configured for optically coupling to lenses of the first optical fiber connector. Light transmitting through the first lenses 112 is converged toward the second surface 12.

The optical fiber connector adapter 100 further includes two positioning posts 121 and two lenses 122 on the second surface 12. The positioning posts 121 protrude from the second surface 12. The positioning posts 121 are configured for insertion into positioning holes of the second optical fiber connector. In this embodiment, the positioning posts 121 are cylindrical, and have a convex end 123 convexing from the second surface 12. The positioning posts 121 are respectively aligned with the two positioning holes 111. A depth of each of the positioning holes 111 is equal to a height of each of the positioning posts 121.

The second lenses 122 protrude from the second surface 12, and are arranged between the two positioning posts 121. The second lenses 122 are aligned with the first lenses 112. The second lenses 122 are convexing from the second surface 12. The second lenses 122 are configured for optically coupling to lenses of the second optical fiber connector.

It is noted that the number of the first lens 112 and the second lens 122 can be one or more than two. In an alternative embodiment, each of the positioning posts 121 can also have other similar shapes, such as a prism. The number of the positioning post 121 can also be one or more than two. In another alternative embodiment, the number of the positioning post 121 is one, and the sectional view of the positioning post 121 has a shape of a closed loop around the second lenses 122 taken along a surface parallel with the first surface 11. The positioning holes 111 can be altered similar to the positioning post 121.

Figure 2:
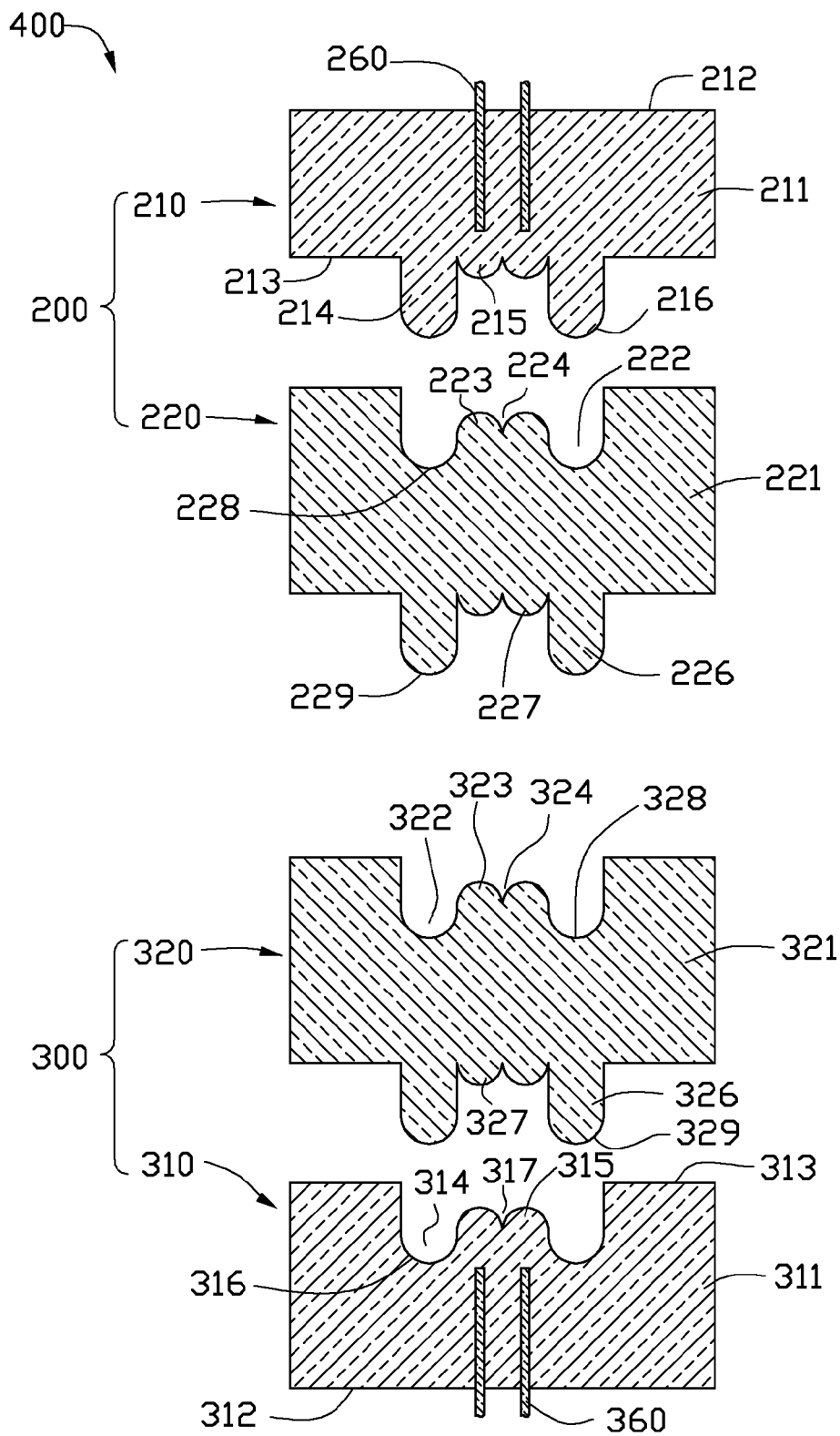
FIG. 2 is a schematic, disassembled sectional view of an optical fiber connector assembly according to a second embodiment.
Figure 3:
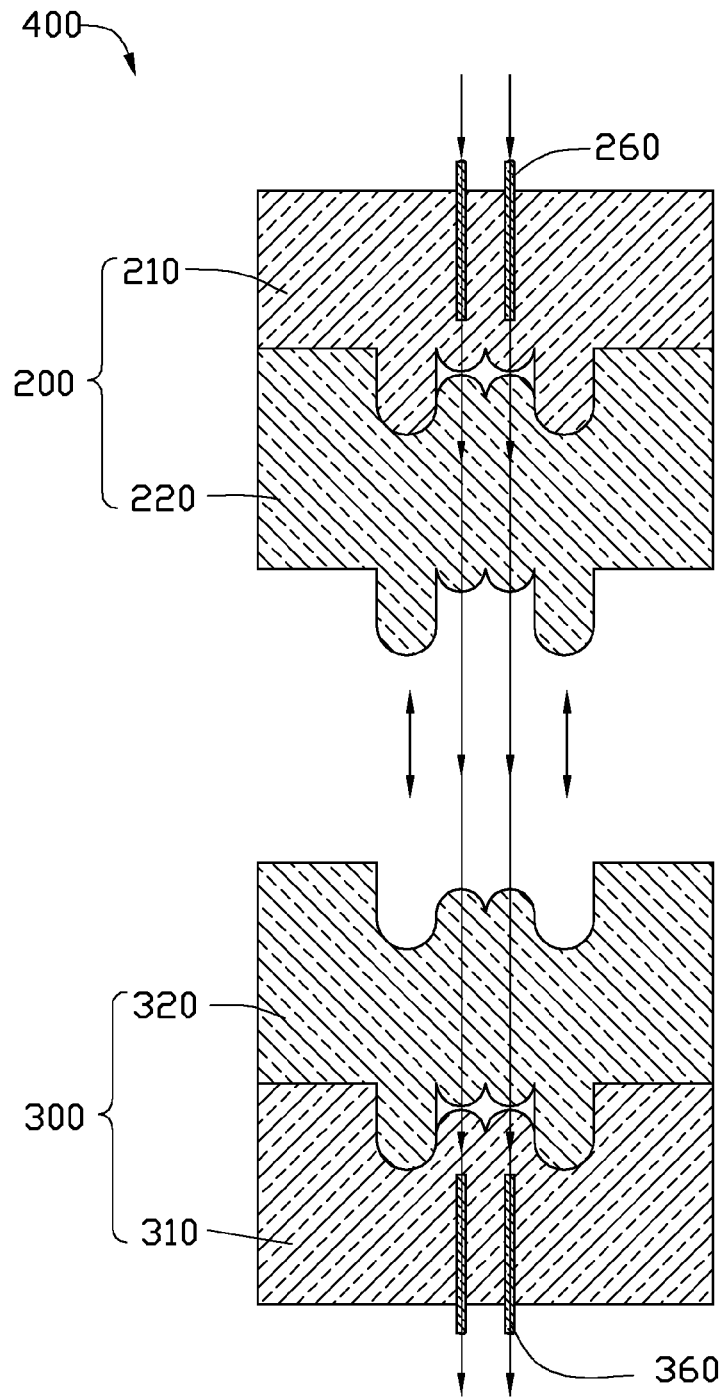
FIG. 3 is an assembled view of the optical fiber connector assembly of FIG. 2.

FIGS. 2 and 3, illustrate an optical fiber connector assembly 400 in accordance with a second exemplary embodiment. The optical fiber connector assembly 400 includes a male terminal 200 and a female terminal 300. The male terminal 200 includes a male optical fiber connector 210 and a first optical fiber connector adapter 220. The female terminal 300 includes a female optical fiber connector 310 and a second optical fiber connector adapter 320.

The male optical fiber connector 210 includes a first main body 211 and two first optical fibers 260. The first main body 211 has a first surface 212, and an opposite second surface 213 parallel with the first surface 212. The first optical fibers 260 are inserted in the main body 211 through the first surface 212.

The male optical fiber connector 210 further includes two first positioning posts 214 and two first lenses 215 on the second surface 213. In this embodiment, the first positioning posts 214 are cylindrical, and have a first convex end 216. The first convex end 216 is convexing away from the second surface 213. The first lenses 215 protrude from the second surface 213, and are arranged between the two first positioning posts 214. The first lenses 215 are convexing away from the second surface 213. The first lenses 215 are optically aligned with the respective the first optical fibers 260, and converge the light transmitted from the first optical fibers 260.

The first optical fiber connector adapter 220 is identical to the optical fiber connector adapter 100 of the first exemplary embodiment. The first optical fiber connector adapter 220 includes a second lens body 221, two first positioning holes 222, a lens hole 224, two second lenses 223, two second positioning posts 226, and two third lenses 227 respectively corresponding with the lens body 10, the positioning holes 111, the lens hole 110, the first lenses 112, the positioning posts 121 and the second lenses 122 of the optical fiber connector adapter 100 of the first exemplary embodiment. The lens body 221 has a first concave surface 228 at an end of each of the first positioning holes 222. The two second positioning posts 226 each have a second convex end 229 convex away from the lens body 221. The first concave surfaces 228 and the second convex ends 229 correspond with the concave surfaces 113 and the convex ends 123 of the optical fiber connector adapter 100 of the first exemplary embodiment.

The first positioning posts 214 of the male optical fiber connector 210 are detachably received in the respective first positioning holes 222. The first positioning posts 214 match the respective first positioning holes 222, and the first convex ends 216 of the first positioning posts 214 engage with the respective first concave surfaces 228 of the first positioning holes 222. The second lenses 223 are facing toward and aligned with the respective first lenses 215, and converge the light transmitted from the first lenses 215 to the third lenses 227 through the lens body 221 of the first optical fiber connector adapter 220. The first lenses are received in the lens hole 224.

The female optical fiber connector 310 includes a second main body 311 and two optical fibers 360. The second main body 311 has a third surface 312, and an opposite, parallel fourth surface 313. The second optical fibers 360 are inserted in the main body 311 through the third surfaces 212.

The fourth surface 313 defines two second positioning holes 314 and a lens hole 317 in the fourth surface 313. The lens hole 317 is arranged between the second positioning holes 314. In this embodiment, the second positioning holes 314 are blind and cylindrical. The second main body 311 has a second concave surface 316 at an end of each of the second positioning holes 314. Two fourth lenses 315 are formed on a bottom in the lens hole 317. The two fourth lenses 315 are located between the second positioning holes 314. The fourth lenses 315 is located beneath the fourth surface 313, and are convexing toward the third surface 312. The two fourth lenses 315 are optically aligned with the second optical fibers 360, and converge light to the second optical fibers 360.

The second optical fiber connector adapter 320 is identical to the optical fiber connector adapter 100 of the first exemplary embodiment. The second optical fiber connector adapter 320 includes a lens body 321, two third positioning holes 322, a lens hole 324, two fifth lenses 323, two third positioning posts 326, and two sixth lenses 327 respectively corresponding with the lens body 10, the positioning holes 111, the lens hole 110, the first lenses 112, the positioning posts 121 and the second lenses 122 of the optical fiber connector adapter 100 of the first exemplary embodiment. The lens body 321 has a third concave surface 328 at an end of the third positioning holes 322. The two third positioning posts 326 each have a third convex end 329. The third convex end 329 is convexing away from the lens body 321. The third concave surfaces 328 and the third convex ends 329 correspond with the concave surfaces 113 and the convex ends 123 of the optical fiber connector adapter 100 of the first exemplary embodiment.

The third positioning posts 326 of the second optical fiber connector adapter 320 are detachably received in the respective second positioning holes 314. The third positioning posts 326 match to the respective second positioning holes 314, and the third convex end 329 of the third positioning posts 326 engage with the respective second concave surfaces 316 of the second positioning holes 314. The sixth lenses 327 are facing toward and aligned with the respective fourth lenses 315, and converge the light transmitted from the fifth lenses 323 to the fourth lenses 315. The sixth lenses 327 are received in the lens hole 317.

In use, the male terminal 200 is optically coupled to the female terminal 300 in such a way that the two second positioning posts 226 are inserted into the respective two third positioning holes 322. The second positioning posts 226 match the respective third positioning holes 322, and the second convex ends 229 of the second positioning posts 226 engage with the respective third concave surface 328 of the third positioning holes 322. The third lenses 227 are received in the lens hole 324. After that, the first optical fiber 230, the first lenses 215, the second lenses 223, the third lenses 227, the fifth lenses 323, the sixth lenses 327, the fourth lenses 315 and the second fiber 360 are optically aligned with each other. The light output from the first optical fiber 260 is transmitted through the first lenses 215, the second lenses 223, the third lenses 227, the fifth lenses 323, the sixth lenses 327, the fourth lenses 315 in the described order, and finally into the second optical fiber 360. The two second positioning posts 226 are detachable from the third positioning holes 322.

The number of the first lens 215, the second lens 223, the third lens 227, the fourth lens 315, the fifth lens 323 and the sixth lens 327 can be one or more than two. In an alternative embodiment, each of the first positioning posts 214, each of the second positioning posts 226, and each of the third positioning posts 326 can also have other similar shapes, such as a prism. The number of the first positioning post 214, the second positioning post 226, and the third positioning post 326 can also be one or more than two. In another alternative embodiment, the number of the first positioning post 214, the second positioning post 226, or the third positioning post 326 is one, and the sectional view of the first positioning post 214, the second positioning post 226, or the third positioning post 326 has a shape of a closed loop around the respective lenses. The first positioning holes 222, the second positioning holes 314, and the third positioning holes 322 can be altered similar to the positioning post 121. As long as the first positioning posts 214 can engage with the respective first positioning holes 222, the second positioning posts 226 can engage with the respective third positioning holes 322, and the third positioning posts 326 can engage with the respective second positioning holes 314.

In this embodiment, the first optical fiber connector adapter 220 and second optical fiber connector adapter 220 can be respectively kept coupled to the male optical fiber connector 210 and the female optical fiber connector 310 when the male terminal 200 are frequently plugged in and out of the female terminal 300. In such case, there is no need to plug the male optical fiber connector 210 in and out of the female optical fiber connector 310 too often. In addition, the first optical fiber connector adapter 220 is detachable from the male optical fiber connector 210, and the second optical fiber connector adapter 320 detachable from the female optical fiber connector 310. When the second positioning posts 226 are plugged in and out of the third positioning holes 322 too often to cause the first optical fiber connector adapter 220 and the optical fiber connector adapter 320 to misalign, the first optical fiber connector adapter 220 or/and the second optical fiber connector adapter 320 can be detached and replaced by another first optical fiber connector adapter 220 or/and another second optical fiber connector adapter 320. Therefore, there is no need to replace the male optical fiber connector 210 and the female optical fiber connector 310. This will lengthen the lifetime of the male optical fiber connector 210 and the female optical fiber connector 310.

The described embodiments are intended to illustrate rather than limit the disclosure. Variations may be made to the embodiments and methods without departing from the spirit of the disclosure. Accordingly, it is appropriate that the appended claims be construed broadly and in a manner consistent with the scope of the disclosure.

What is claimed is:

1. An optical fiber connector adapter for coupling a first optical fiber connector to a second optical fiber connector, the optical fiber connector adapter comprising:
    a lens body comprising a first surface and an opposite second surface parallel with the first surface;
    at least one positioning hole defined in the first surface and configured for engaging at least one positioning post of the first optical fiber connector;
    at least one lens hole defined in the first surface and at least one first lens formed on a bottom in the at least one lens hole, the at least one first lens being beneath the first surface and adjacent to the at least one positioning hole, the at least one first lens configured for optically coupling to at least one lens of the first optical fiber connector; and
    at least one positioning post and at least one second lens protruding from the second surface, at least one positioning post configured for insertion into at least one positioning hole of the second optical fiber connector, the at least one second lens being aligned with the at least one first lens, the at least one second lens configured for optically coupling to at least one lens of the second optical fiber connector.

2. The optical fiber connector adapter of claim 1, wherein the at least one positioning hole comprises two positioning holes, the at least one positioning post comprising two positioning posts, the at least one first lens being arranged between the two positioning holes, the at least one second lens being arranged between the two positioning holes.

3. The optical fiber connector adapter of claim 2, wherein the at least one first lens comprises two first lenses, the at least one second lens comprising two second lenses, the first lenses being respectively aligned with the second lenses.

4. The optical fiber connector adapter of claim 2, wherein a depth of each of the positioning holes is equal to a height of each of the positioning posts.

5. The optical fiber connector adapter of claim 4, wherein the lens body is comprised of a same light pervious material.

6. The optical fiber connector adapter of claim 4, wherein the positioning holes are aligned with the respective positioning posts.

7. An optical fiber connector assembly, comprising:
    a male optical fiber connector comprising:
        a main body comprising a first surface and an opposite second surface parallel with the first surface;
        two first optical fibers inserted in the main body through the first surface; and
        two first positioning posts and two first lenses protruding from the second surface, the first lenses being aligned with the respective optical fibers; and
    an optical fiber connector adapter, comprising:
        a lens body comprising a first surface and an opposite second surface parallel with the first surface;
        two first positioning holes defined in the first surface and configured for detachably receiving the first positioning posts of the male optical fiber connector;
        a lens hole defined in the first surface and two first lenses formed on a bottom in the lens hole, the first lenses located between the first positioning holes, the first lenses of the optical fiber connector adapter facing toward and aligned with the first lenses of the male optical fiber connector, the first lenses of the male optical fiber connector received in the lens hole; and
        two second positioning posts and two second lenses protruding from the second surface, the second lenses of the optical fiber connector adapter being aligned with the first lenses thereof.

8. The optical fiber connector assembly of claim 7, wherein the lens body is comprised of a same light pervious material.

9. An optical fiber connector assembly, comprising:
    a female optical fiber connector comprising:
        a main body comprising a first surface and an opposite second surface parallel with the first surface;
        two first optical fibers inserted in the main body through the first surface;
        two first positioning holes defined in the second surface; and
        a first lens hole defined in the second surface and two first lenses formed on a bottom in the first lens hole, the first lenses located between the first positioning holes; and
    an optical fiber connector adapter, comprising:
        a lens body comprising a first surface and an opposite second surface parallel with the first surface;
        two positioning posts and two second lenses protruding from the first surface of the lens body, the positioning posts configured for detachably insertion into the respective first positioning holes of the female optical fiber connector, the second lenses of the optical fiber connector adapter facing toward and aligned with the first lenses of the female optical fiber connector, the second lenses of the optical fiber connector adapter received in the first lens hole;
        two second positioning holes defined in the second surface of optical fiber connector adapter; and
        a second lens hole defined in the second surface of the optical fiber connector adapter and two third lenses formed on a bottom in the second lens hole, the third lenses located between the second positioning holes.

10. The optical fiber connector assembly of claim 9, wherein the lens body is comprised of a same light pervious material.

* * * * *